United States Patent
Takedomi

(10) Patent No.: US 9,062,395 B2
(45) Date of Patent: Jun. 23, 2015

(54) LINER FOR UNVULCANIZED RUBBER MEMBER

(75) Inventor: Shogo Takedomi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 531 days.

(21) Appl. No.: 13/144,180

(22) PCT Filed: Jan. 12, 2010

(86) PCT No.: PCT/JP2010/050241
§ 371 (c)(1),
(2), (4) Date: Jul. 12, 2011

(87) PCT Pub. No.: WO2010/082569
PCT Pub. Date: Jul. 22, 2010

(65) Prior Publication Data
US 2011/0269361 A1      Nov. 3, 2011

(30) Foreign Application Priority Data
Jan. 13, 2009   (JP) .................................. 2009-005086

(51) Int. Cl.
*D03D 15/00*   (2006.01)
*D03D 1/00*    (2006.01)
(Continued)

(52) U.S. Cl.
CPC ............... *D03D 1/00* (2013.01); *D03D 13/008* (2013.01); *D03D 15/0088* (2013.01); *B29D 2030/0038* (2013.01); *D10B 2505/022* (2013.01); *D10B 2505/12* (2013.01)

(58) Field of Classification Search
CPC ...... D03D 1/00; D03D 13/008; D03D 15/088
USPC .................. 442/185, 186, 189, 192
See application file for complete search history.

(56) References Cited

U.S. PATENT DOCUMENTS 1,543,283 A * 6/1925 Falor et al. .................... 428/143
3,948,722 A * 4/1976 Wheeldon et al. ............ 162/289
(Continued)

FOREIGN PATENT DOCUMENTS

JP          60-92953 U     6/1985
JP          2-154027 A     6/1990
(Continued)

OTHER PUBLICATIONS

Chinese Office Action dated Jul. 26, 2012 issued in Chinese Application No. 201080004442.3.
(Continued)

*Primary Examiner* — Andrew Piziali
(74) *Attorney, Agent, or Firm* — Sughrue Mion, PLLC

(57) ABSTRACT

A liner for an unvulcanized rubber member is provided that has excellent durability while maintaining the tackiness of an unvulcanized rubber member. An unvulcanized rubber member liner 10 is a plain fabric made from weft threads 14 of a split yarn of 1000 to 1330 dtex fiber diameter threads formed from a smooth faced resin film. Fine linear threads of multi-filament thread are employed as warp threads 12. Due to employing smooth surfaced split yarn weft threads 14, the surface of an unvulcanized rubber member 16 that makes contact with the weft threads 14 is also made smooth. The multi-filament threads of the warp threads 12 suppress the contact surface area with the unvulcanized rubber member 16 to a minimum. Accordingly the surface of the unvulcanized rubber member is made smoother overall than when a liner formed from a conventional plain fabric is employed. This results in excellent release properties while excellent tackiness of the unvulcanized rubber member can be maintained. A high durability is also obtained due to coating of the liner surface not being required.

2 Claims, 3 Drawing Sheets

(51) Int. Cl.
    *D03D 13/00*      (2006.01)
    *B29D 30/00*      (2006.01)

(56) References Cited

U.S. PATENT DOCUMENTS

| | | | | |
|---|---|---|---|---|
| 4,290,209 | A | * | 9/1981 | Buchanan et al. ............... 34/123 |
| 4,995,429 | A | * | 2/1991 | Kositzke ................... 139/383 R |
| 5,089,324 | A | * | 2/1992 | Jackson ........................ 442/195 |
| 5,225,269 | A | * | 7/1993 | Bohlin .......................... 442/207 |
| 2010/0239810 | A1 | * | 9/2010 | Bhatnagar et al. ............ 428/113 |

FOREIGN PATENT DOCUMENTS

| | | | | |
|---|---|---|---|---|
| JP | 02154027 | A | * | 6/1990 |
| JP | 9-201924 | A | | 8/1997 |
| JP | 9-234737 | A | | 9/1997 |
| JP | H09-235702 | A | | 9/1997 |
| JP | 2002-002874 | A | | 1/2002 |

OTHER PUBLICATIONS

International Search Report for PCT/JP2010/050241, dated Feb. 9, 2010.

Japanese Office Action dated Oct. 22, 2013 issued in Japanese Patent Application No. 2009-005086.

* cited by examiner

LINER FOR UNVULCANIZED RUBBER MEMBER

TECHNICAL FIELD

The present invention relates to a liner for an unvulcanized rubber component for attaching to an unvulcanized rubber member to prevent unvulcanized rubber member-to-member adhering.

BACKGROUND ART

Sometimes when storing members used in tire manufacturing made from raw unvulcanized rubber, such as tread rubber and inner-liners, a strip shaped unvulcanized rubber member supplied from an extruder and calender roll is wound and stored. Due to the tackiness of the unvulcanized rubber member, if it is simply wound up then there is a tendency for the wound unvulcanized rubber member to adhere to itself, leading to deformation of the unvulcanized rubber member when it is unwound.

Hence a winding liner is generally interposed between windings of the unvulcanized rubber member to prevent unvulcanized rubber member-to-member adhering. Such a stored unvulcanized rubber member wound in this manner with the winding liner interposed then has the winding liner removed for supply to tire assembly.

The winding liner employed conventionally here mainly uses a synthetic fiber fabric. Conventional winding liners generally employ filament cords having substantially circular shaped cross-section of the same diameter as each other for all the warp threads and weft threads.

A plain fabric is employed as such a type of unvulcanized rubber member liner, using polyester, polypropylene, vinylon, nylon and the like for the thread material. General purpose plain fabrics include those that use vinylon spun thread for both the warp threads and the weft threads, and those that use polyester filament thread for both the warp threads and the weft threads.

However an issue arises in that for simple plain fabric formed with warp threads and weft threads, many protrusions and indentations arise on the fabric surface due to the weft threads and the warp threads when the warp threads and the weft threads are woven in the usual manner. The unvulcanized rubber member then tends to penetrate into the indentations, with a detrimental effect on release properties. Further issues arising are a reduction in tackiness due to protrusions and indentations on the surface of the unvulcanized rubber member, reducing bonding properties, such as during molding a tire. There is a proposal for a liner with improved release properties in which the surface of the fabric is covered by a non-stick outer covering layer, such as one made from a silicone resin or a fluoro resin (see, for example, Japanese Patent Application Laid-Open (JP-A) No. 9-234737).

SUMMARY OF INVENTION

Technical Problem

The liner of JP-A No. 9-234737 has a more complicated structure than a simple plain fabric formed from warp threads and the weft threads, due to the surface of the fabric being covered by a non-stick outer covering layer, resulting in manufacturing complications. The non-stick outer covering layer also sometimes peels off when used for a long period of time, resulting in the issue of inferior durability compared to a liner made from a simple plain fabric without any non-stick outer covering layer.

An object of the present invention is to address the above issues and provide an unvulcanized rubber member liner that secures tackiness of the unvulcanized rubber member and has excellent durability.

Solution to Problem

A first aspect of the present invention provides a liner for use with an unvulcanized rubber member, the unvulcanized rubber member liner including plural warp threads extending along a length direction and plural interwoven weft threads extending along a width direction, wherein the weft threads are configured by a flat yarn.

Explanation follows regarding operation of the unvulcanized rubber member liner according to the first aspect of the present invention.

Weft threads made from flat yarn are flat in cross-sectional shape, with the surface of the thread being both smooth and flat. Accordingly the liner surface is also smoother than with a conventional simple plain fabric. Accordingly, the surface of the unvulcanized rubber member in contact with the weft threads is also smoother, and the release properties of the unvulcanized rubber member can be suppressed from being degraded by the presence of protrusions and indentations. The ability of the unvulcanized rubber member liner to maintain tackiness can also be raised due to the face of the unvulcanized rubber member that determines its tackiness being smoother. A high durability is also obtained due to there being no requirement to use a covering of a non-stick outer covering layer on the surface of the liner.

An unvulcanized rubber member liner according to a second exemplary embodiment of the present invention is the unvulcanized rubber member liner according to the first exemplary embodiment, wherein the weft threads of the flat yarn have linear mass density of 1000 to 1330 dtex.

Explanation follows regarding operation of the unvulcanized rubber material liner according to the second exemplary embodiment of the present invention. By setting the fiber diameter of the weft threads to 1000 to 1330 dtex a drop in the release properties can be appropriately suppressed and high tackiness of the unvulcanized rubber member can be secured.

Advantageous Effects of Invention

As explained above, the unvulcanized rubber material liner of the present invention configured as described above has the fundamental capability to prevent unvulcanized rubber member-to-member adhering, secures tackiness of the unvulcanized rubber member, and has excellent durability.

DESCRIPTION OF EMBODIMENTS

Figure 1:
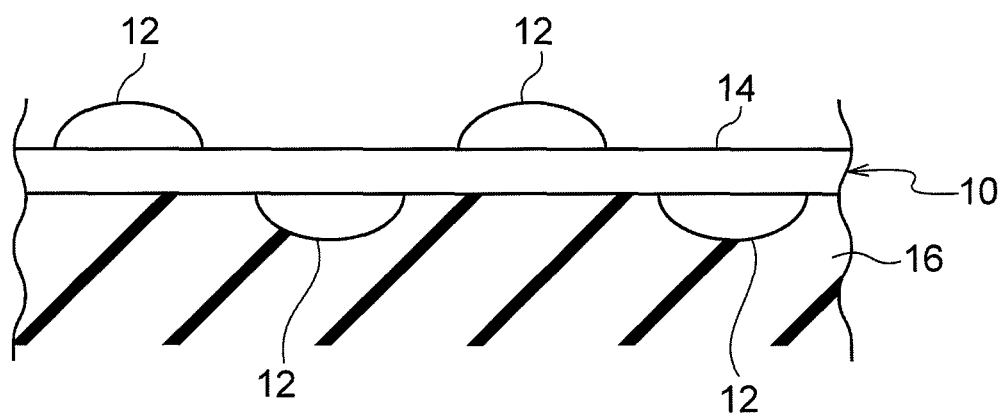
FIG. 1 is cross-section of an unvulcanized rubber member liner and an unvulcanized rubber member.

Explanation follows regarding an exemplary embodiment of a liner for an unvulcanized rubber member of the present invention, with reference to FIG. 1. FIG. 1 is a cross-section take along a weft thread 14 of an unvulcanized rubber member liner 10. The unvulcanized rubber member liner 10 of the present exemplary embodiment is plain woven with plural strands of warp threads 12 extending along the liner length direction and plural strands of weft threads 14 extending along the liner width direction, with the warp threads 12 and the weft threads 14 intersecting with each other.

The weft threads 14 have a flattened shape when viewed in cross-section, and are formed from a smooth surfaced flat yarn made from a resin film (also referred to as a split yarn. Film yarns of a plastic film formed into fiber shapes also exist and in the present invention these also fall within the category of flat yarns). The linear mass density of the flat yarn is set at 1000 to 1330 dtex. The flat faced portions of the flat yarn are set parallel to the surface of the unvulcanized rubber member liner 10.

The material of the weft threads 14 preferably has excellent release properties from unvulcanized rubber members. Preferably a material such as polyethylene terephthalate (PET), polypropylene (PP) or polyethylene is, for example, employed.

Linear fine multi-filaments are employed as the warp threads 12 in the present exemplary embodiment. Winding tension acts when the unvulcanized rubber member liner 10 is wound up with the strip shaped unvulcanized rubber member. The warp threads 12 are accordingly preferably made as fine as possible in order to both secure tensional strength and to minimize the contact surface area with the unvulcanized rubber member. The reason a multi-filament thread is employed is that the thread diameter is thinner than other types of thread with the same strength. Configuration may be made with the warp threads 12 formed from other types of thread than multi-filament threads as long as the thread has strength comparable to that of a multi-filament thread and a thin filament diameter.

The linear mass density of the warp threads 12 in the present exemplary embodiment is set at 560 dtex, however other linear mass density may be employed. Preferably a material with high tensional strength and with excellent release properties from the unvulcanized rubber member is employed as the warp threads 12. Preferable examples of materials that may be employed include polyethylene terephthalate (PET), polypropylene (PP), and polyethylene (PE). The weaving density of the warp threads 12 in the present exemplary embodiment is 64 strands/5 cm, however other weaving densities of thread may be employed.

Operation

Explanation follows regarding operation of the unvulcanized rubber member liner 10 of the present exemplary embodiment.

By, for example, winding the unvulcanized rubber material liner 10 in together with the strip shaped unvulcanized rubber material 16, an unvulcanized rubber material 16 makes contact with the unvulcanized rubber material liner 10, as shown in FIG. 1.

The unvulcanized rubber member liner 10 employs a split yarn with the weft smooth surfaced threads 14, resulting in the surface of the unvulcanized rubber member 16 in contact with the weft threads 14 also being smooth.

In the unvulcanized rubber member liner 10, fine linear multi-filament threads of high tensional strength are employed as the warp threads 12, enabling the contact surface area between the warp threads 12 and the unvulcanized rubber member 16 to be minimized.

Due to employing the unvulcanized rubber member liner 10 of the present exemplary embodiment, the unvulcanized rubber member surface is made smoother overall than when employing an unvulcanized rubber member liner made from ordinary plain fabric that does not employ split yarn. Excellent release properties result, and excellent tackiness of the unvulcanized rubber member 16 can be maintained.

A high durability is also obtained due to there being no requirement for a coating or the like to be applied to the liner surface.

Flat yarn with flattened cross-section and smooth surface portions is employed as the fibers in the present exemplary embodiment, however configuration may be made with fibers other than flat yarn as long as they are fibers with flattened cross-section and smooth flat portions. Regarding the degree of flattening, preferably the ratio of width to thickness (width/thickness) is 4.3 or above.

In the present exemplary embodiment, a multi-filament thread is employed as the warp threads 12, however according to the circumstances configuration may be made with threads other than multi-filament threads, such as flat yarn.

In conventional winding liners the following issues arise due to contact between the filament cords of the liner and the unvulcanized rubber member, however the following issues can be solved by employing the unvulcanized rubber member liner 10 of the present exemplary embodiment.

(1) for a high-tackiness unvulcanized rubber member there is large adhesion (surface area) between the filament cords and the unvulcanized rubber member, leading to the unvulcanized rubber member being stretched during winding and separating.

(2) in an unvulcanized rubber member of a thin material with low sheet strength, force for separating becomes concentrated at the adhered portions leading to significant stretching of the unvulcanized rubber member.

(3) when an unvulcanized rubber member of low green modulus is wound the pressure acting on the unvulcanized rubber member in the portion near to the core is high, and the contact surface area between the filament cords and the unvulcanized rubber member increases, leading to the above issues being even more significant.

(4) occurrence of bloom (the phenomenon of sulfur precipitating out on the surface) tends to increase with an unvulcanized rubber member having a high sulfur blend ratio due to stimulation imparted to the unvulcanized rubber member as the surface area in contact with the winding liner increases. As the number of times of winding and unwinding increases there is more significant stimulation due to the further increase in the contact surface area, leading to significant blooming and a deterioration of precision of tire assembly.

By employing a multi-filament thread with a fiber diameter of 560 dtex for the warp threads 12 the contact surface area with the unvulcanized rubber member 16 can be reduced while still maintaining the strength (mainly winding tension) of the unvulcanized rubber member liner 10.

TEST EXAMPLE 1

In order to confirm the effect of the present invention a conventionally constructed unvulcanized rubber member liner and an unvulcanized rubber member liner applied with the present invention are prepared. Winding is performed with a tire inner-liner as an unvulcanized rubber member. The separation resistance force between the inner-liner and the unvulcanized rubber member liner, and the tackiness of the inner-liner are then measured.

Example 1: split yarn of 1000 dtex PP is employed as the weft thread. The weaving density of the weft threads is 35 strands/5 cm. Multi-filament yarn formed from twisting two stands of 280 dtex PET is employed as the warp threads. The weaving density of the warp threads is 101 strands/5 cm.

Conventional Example 1: multi-filament yarn formed by twisting two strands of 280 dtex PET is employed as the weft thread. The weaving density of the weft threads is 101 strands/5 cm. Multi-filament yarn formed by twisting two stands of 280 dtex PET is employed as the warp threads. The weaving density of the warp threads is 101 strands/5 cm.

In a test the above specifications of unvulcanized rubber member liner (width 650 mm, length 230 m) are wound together with unvulcanized rubber inner-liner rubber to form a 150 m reel. After leaving for a day the real is then unwound and the separation resistance force between the liner and the inner-liner rubber, and the tackiness of the inner-liner rubber is measured in plural locations.

Figure 2A:
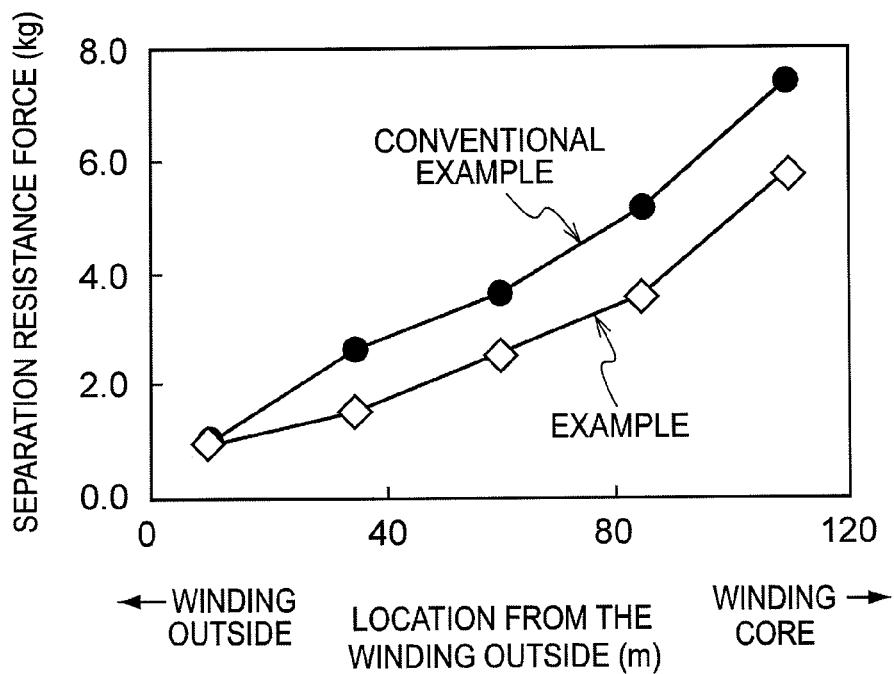
FIG. 2A is a graph illustrating results of Test Example 1.

It can be seen from the test results of separation resistance force, as shown in the graph of FIG. 2A, that the unvulcanized rubber member liner of the exemplary embodiment suppresses the separation resistance force to a smaller value than that of the conventional unvulcanized rubber member liner. In FIG. 2A the separation resistance force (kg) is shown on the vertical axis of the graph and the location (m) from the winding outside is shown on the horizontal axis.

Figure 2B:
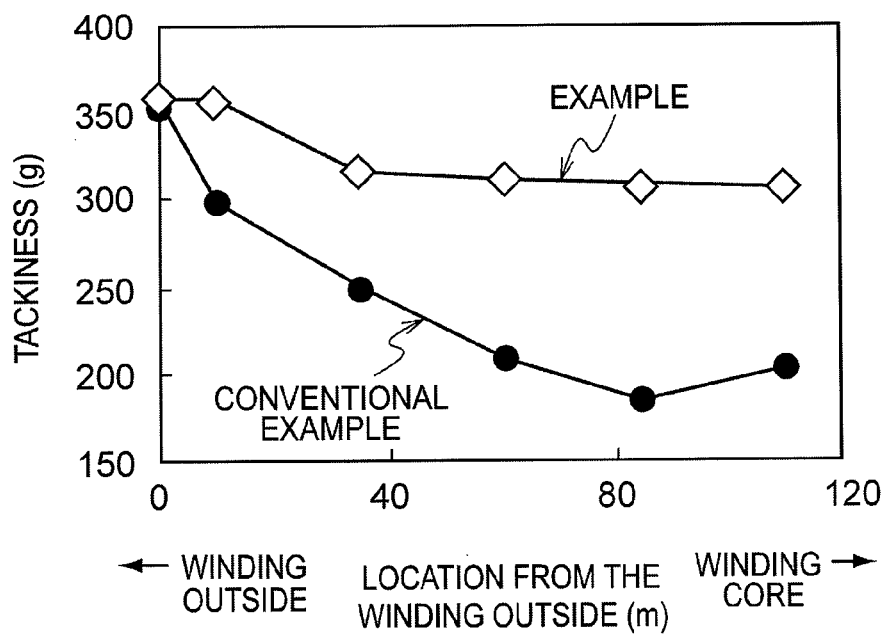
FIG. 2B is a graph illustrating results of Test Example 1.

It can be seen from the tackiness test results, as shown in the graph of FIG. 2B, that wound inner-liner rubber employed in the unvulcanized rubber member liner of the present exemplary embodiment has higher tackiness than the wound inner-liner rubber employed in the conventional unvulcanized rubber member liner, and excellent tackiness maintenance characteristics are achieved. In the graph of FIG. 2B the tackiness (g) of the inner-liner rubber is shown on the vertical axis, and the location (m) from the winding outside is shown on the horizontal axis.

Measurement method for separation resistance force: the inner-liner is pulled out from a roll of the inner-liner rubber wound up together with the liner, and the separation resistance force (g) is measured while the liner is being separated from the inner-liner by nipping the leading end of the inner-liner with a grip and pulling the grip with a pull tension gauge (tensile stress measurement instrument).

Tackiness measurement method: a PICMA Tack Tester made by Toyo Seiki Seisaku-Sho, Ltd. is employed to press the aluminum roll of the tester onto the inner-liner rubber with a force of 500 gf for 30 seconds, then the tackiness (g) is measured as the response force (the average value measured at 5 points of different measurement locations on the inner-liner rubber) as aluminum roll is raised at a rate of 30 m/min.

TEST EXAMPLE 2

An Example 2 and Conventional Example 2 with specifications of different weft threads from those of the Example 1 and the Conventional Example 1 are employed and the same test as test example 1 are performed.

Example 2: split yarn of 1330 dtex PP is employed as the weft threads. The weaving density of the weft threads is 35 strands/5 cm. Multi-filament yarn formed from twisting two stands of 280 dtex PET is employed as the warp threads. The weaving density of the warp threads is 101 strands/5 cm.

Figure 3A:
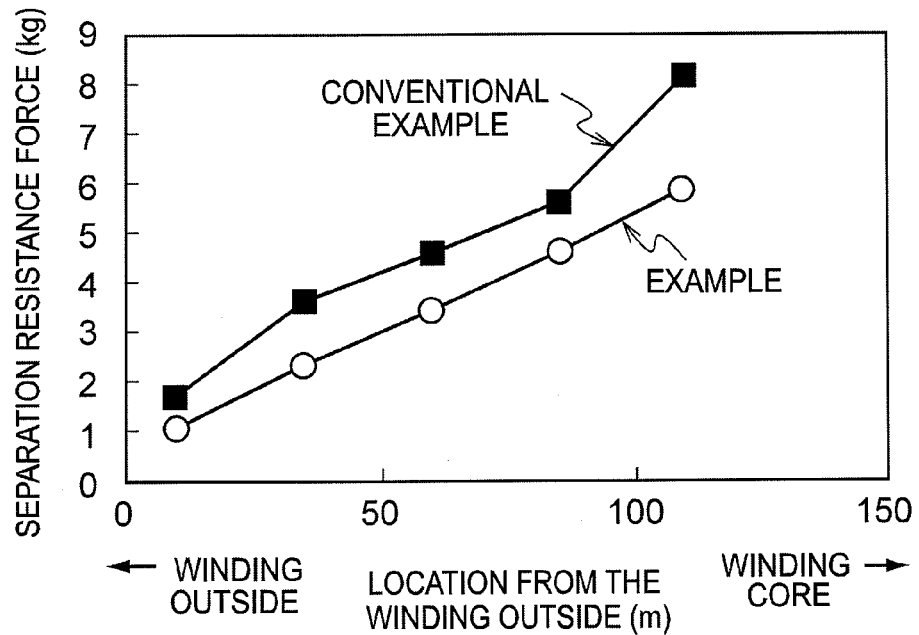
FIG. 3A is a graph illustrating results of Test Example 2.

It can be seen from the test results of separation resistance force, as shown in FIG. 3A, that the unvulcanized rubber member liner of the Example suppresses the separation resistance force to a smaller value than when the conventional unvulcanized rubber member liner is employed.

Figure 3B:
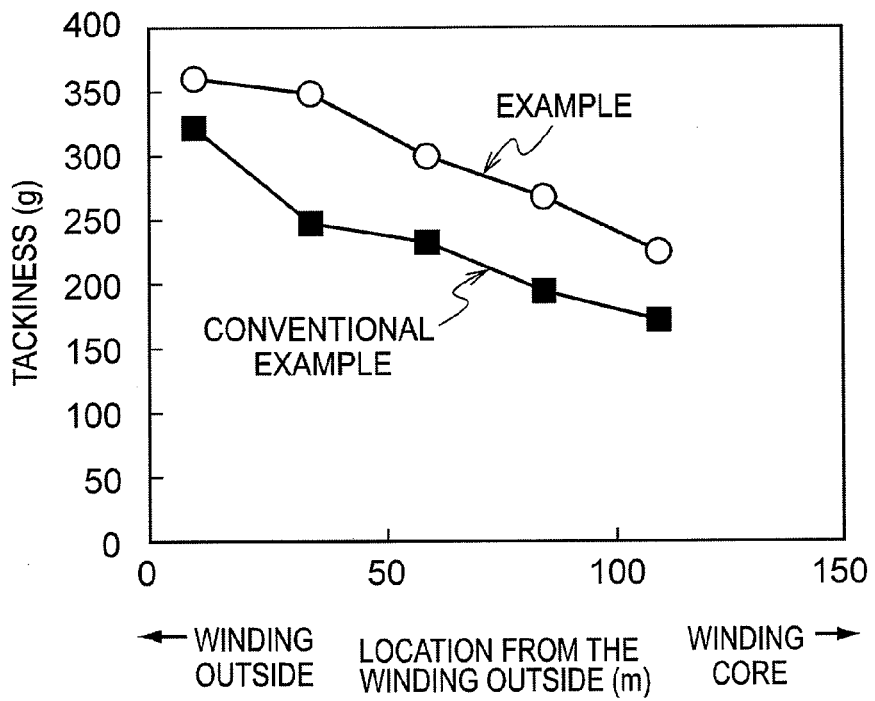
FIG. 3B is a graph illustrating results of Test Example 2.

It can be seen from the tackiness test results, as shown in the graph of FIG. 3B, that wound inner-liner rubber when the unvulcanized rubber member liner of the Example is employed has higher tackiness than the wound inner-liner rubber when the conventional unvulcanized rubber member liner is employed, and high tackiness and excellent tackiness maintenance characteristics are achieved.

The invention claimed is:

1. An unvulcanized rubber member, comprising:
   an unvulcanized rubber material; and
   a liner contacting with the unvulcanized rubber material, the liner comprising a plurality of warp threads extending along a length direction and a plurality of interwoven weft threads extending along a width direction, wherein the weft threads are configured by a flat yarn;
   the ratio of width to thickness (width/thickness) of the weft threads is 4.3 or greater; and
   the weaving density of the weft threads is 35 strands/5 cm and the weaving density of the warp threads is 101 strands/5 cm.

2. The unvulcanized rubber member of claim 1, wherein the weft threads of the flat yarn have linear mass density of 1000 to 1330 dtex.

* * * * *